(12) United States Patent
Sugawara

(10) Patent No.: US 8,259,215 B2
(45) Date of Patent: Sep. 4, 2012

(54) IMAGE PICKUP APPARATUS HAVING FOCUS CONTROL USING PHASE DIFFERENCE DETECTION

(75) Inventor: Atsushi Sugawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 12/607,691

(22) Filed: Oct. 28, 2009

(65) Prior Publication Data
US 2010/0110272 A1    May 6, 2010

(30) Foreign Application Priority Data

Nov. 5, 2008   (JP) ................. 2008-284331

(51) Int. Cl.
G03B 17/00   (2006.01)
G03B 13/00   (2006.01)
H04N 5/232   (2006.01)
(52) U.S. Cl. ........ 348/345; 348/335; 348/349; 348/350; 396/80
(58) Field of Classification Search .......... 348/345–356; 396/79–82
See application file for complete search history.

(56) References Cited

U.S. PATENT DOCUMENTS

| 6,941,068 | B2 | 9/2005 | Matsuda |
| 6,954,233 | B1 | 10/2005 | Ito |
| 7,130,536 | B2 | 10/2006 | Ito |
| 2003/0020825 | A1* | 1/2003 | Higuma et al. ............... 348/354 |
| 2003/0189662 | A1* | 10/2003 | Matsuda ........................ 348/345 |
| 2007/0242942 | A1* | 10/2007 | Nozaki et al. ................. 396/123 |
| 2008/0079840 | A1* | 4/2008 | Kariya et al. ................. 348/345 |
| 2008/0143858 | A1* | 6/2008 | Kusaka ........................ 348/294 |

FOREIGN PATENT DOCUMENTS

| JP | 2000-292684 | 10/2000 |
| JP | 2003-295047 | 10/2003 |

* cited by examiner

Primary Examiner — Chieh M Fan
Assistant Examiner — Dwight C Tejano
(74) Attorney, Agent, or Firm — Cowan, Liebowitz & Latman, P.C.

(57) ABSTRACT

The image pickup apparatus includes an image pickup element including image pickup pixels and focus detection pixels, and first and second focus information calculating parts respectively calculating first focus information based on outputs from the focus detection pixels and second focus information based on an output from a light-receiving element which is provided separately from the image pickup element. The focus information indicates a focus state of an image pickup optical system. The apparatus further includes a correction value calculating part calculating a correction value based on the first focus information and the second focus information, and a controlling part performing focus control of the image pickup optical system based on the second focus information corrected using the correction value.

9 Claims, 12 Drawing Sheets

IMAGE PICKUP APPARATUS HAVING FOCUS CONTROL USING PHASE DIFFERENCE DETECTION

BACKGROUND OF THE INVENTION

The present invention relates to an image pickup apparatus such as a digital camera and a video camera, and more particularly to an image pickup apparatus which performs phase difference detection by using an image pickup element.

There is known a TTL phase difference detection method as an autofocus (AF) method used in an image pickup apparatus. In the TTL phase difference detection method, a part of a light flux from an image pickup optical system is divided into two light fluxes and a shift amount (phase difference) between two images formed by the two divided light fluxes is obtained. Based on the phase difference, a defocus amount of the image pickup optical system is calculated, and a driving amount of a focus lens necessary for obtaining an in-focus state by approaching the defocus amount to 0 is calculated.

In order to divide a light flux that has passed through an exit pupil of the image pickup optical system to obtain signals corresponding to the divided light fluxes, in many cases, an optical path dividing part such as a quick return mirror or a half mirror is provided in an optical path, and a focus detection optical system and an AF sensor are provided posterior to the optical path dividing part. Such a phase difference detection method which uses the AF sensor different from the image pickup element for obtaining a captured image will hereinafter be referred to as "sensor separate type phase difference detection method".

The sensor separate type phase difference detection method enables direct calculation of the driving amount of the focus lens necessary for obtaining an in-focus state. Thus, a focusing operation can be performed within a short period of time. However, the light fluxes forming the two images on the AF sensor through the image pickup optical system and the focus detection optical system and a light flux forming an object image on the image pickup element through the image pickup optical system are different from each other, and hence a correction mechanism for correcting a difference therebetween is necessary, and in-focus accuracy is influenced by accuracy of the correction mechanism.

As another AF method, there is known a contrast detection method. In the contrast detection method, a high-frequency component is extracted from a video signal generated based on an output signal of the image pickup element, and the focus lens is driven in a direction of a level of the high-frequency component toward a peak. When the level of the high-frequency component eventually reaches a predetermined peak range, an in-focus state is determined.

In such a contrast detection method, AF is performed by using the video signal obtained based on the output signal of the image pickup element. Thus, higher in-focus accuracy can be obtained as compared with the sensor separate type phase difference detection method.

However, since the contrast detection method cannot directly calculate the driving amount of the focus lens necessary for obtaining an in-focus state, which is different from the sensor separate type phase difference detection method, the contrast detection method requires a long time to obtain the in-focus state.

Each of Japanese Patent Laid-Open Nos. 2003-295047 and 2000-292684 discloses an AF method in which advantages of such two different AF methods are combined. In the AF method disclosed in Japanese Patent Laid-Open Nos. 2003-295047 and 2000-292684, when an in-focus state is obtained by the contrast detection method, a defocus amount calculated by the sensor separate type phase difference detection method is stored as a correction value in a memory.

After such an adjusting operation, the defocus amount calculated by the sensor separate type phase difference detection method or the driving amount of the focus lens is corrected by using the correction value. This makes it possible to perform AF by the sensor separate type phase difference detection method more accurately.

However, the AF method disclosed in Japanese Patent Laid-Open Nos. 2003-295047 and 2000-292684 needs to perform, immediately after performing AF by the contrast detection method, AF by the sensor separate type phase difference detection method. Therefore, the AF method requires a long time until a series of these adjusting operations is completed.

Further, in order to obtain an in-focus state as accurately as possible by AF of the contrast detection method, it is necessary to prepare a specific object such as a dedicated chart and illumination for obtaining sufficient brightness of an object during the adjusting operations. As a result, a user needs to set an exclusive operation mode for performing the adjusting operations or prepare an exclusive environment, which necessitates time and labor.

SUMMARY OF THE INVENTION

The present invention provides an image pickup apparatus capable of easily obtaining a correction value within a short period of time and realizing higher accuracy of AF performed by the sensor separate type phase difference detection method.

The present invention provides as one aspect thereof an image pickup apparatus including an image pickup element configured to include image pickup pixels for photoelectrically converting an object image formed by a light flux from an image pickup optical system and focus detection pixels for photoelectrically converting two images formed by first light fluxes which are two divided light fluxes from the image pickup optical system, a first focus information calculating part configured to calculate first focus information indicating a focus state of the image pickup optical system based on outputs from the focus detection pixels, a light-receiving element provided separately from the image pickup element and configured to photoelectrically convert two images formed by second light fluxes which are two divided light fluxes from the image pickup optical system, a second focus information calculating part configured to calculate second focus information indicating a focus state of the image pickup optical system based on an output from the light-receiving element, a correction value calculating part configured to calculate a correction value based on the first focus information and the second focus information, and a controlling part configured to perform focus control of the image pickup optical system based on the second focus information corrected using the correction value.

The present invention provides as another aspect thereof a focus control method for an image pickup apparatus which includes an image pickup element configured to include image pickup pixels for photoelectrically converting an object image formed by a light flux from an image pickup optical system and focus detection pixels for photoelectrically converting two images formed by first light fluxes which are two divided light fluxes from the image pickup optical system, and a light-receiving element provided separately from the image pickup element and configured to photoelectrically convert two images formed by second light fluxes which are two divided light fluxes from the image pickup optical system. The method including the steps of calculating first focus information indicating a focus state of the image pickup optical system based on outputs from the focus detection pixels, calculating second focus information indicating a focus state of the image pickup optical system based on an output from the light-receiving element, calculating a correction value based on the first focus information and the second focus information, and performing focus control of the image pickup optical system based on the second focus information corrected by the correction value.

Other aspects of the present invention will become apparent from the following description and the attached drawings.

DESCRIPTION OF THE EMBODIMENTS

Exemplary embodiments of the present invention will hereinafter be described with reference to the accompanying drawings.

Embodiment 1

Figure 1A:
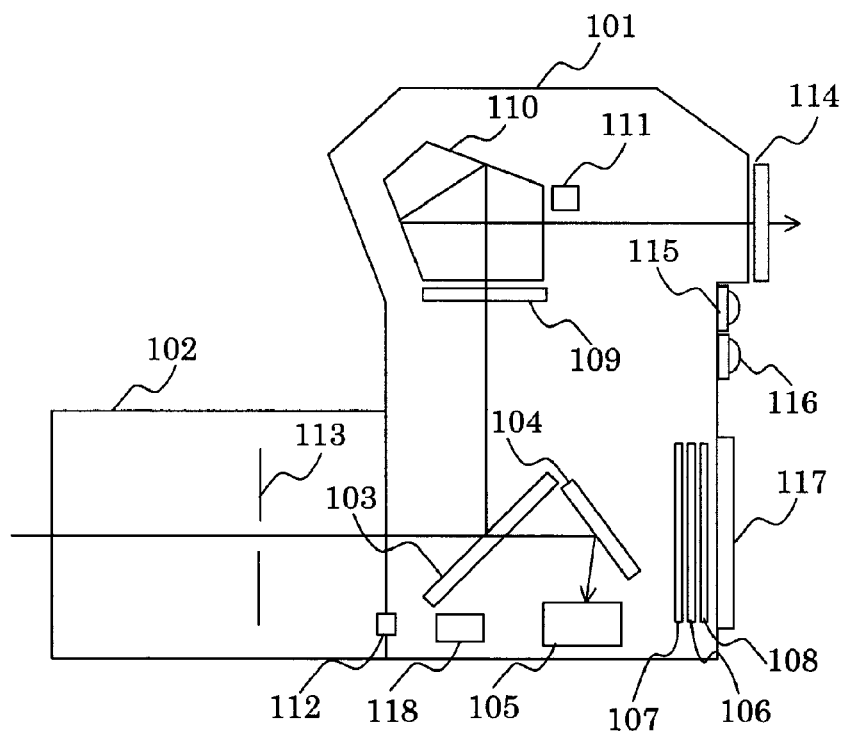
FIGS. 1A and 1B are sectional views of a camera which is Embodiment 1 of the present invention.
Figure 1B:
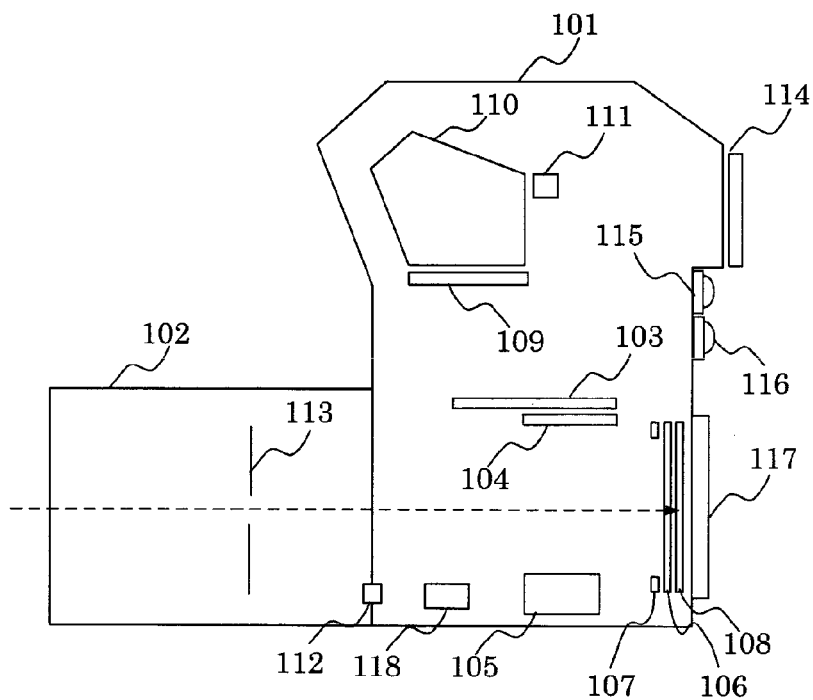

FIGS. 1A and 1B show a configuration of a single lens reflex digital camera as an image pickup apparatus which is a first embodiment (Embodiment 1) of the present invention. FIG. 1A shows an optical viewfinder mode (second mode) of the camera, and FIG. 1B shows a live-view mode (first mode) and an image pickup operation state for capturing a recording image of the camera.

In FIGS. 1A and 1B, reference numeral 101 denotes a camera body, to a front face of which an image pickup lens (image pickup optical system) 102 is detachably attached. The camera body 101 and the image pickup lens 102 are electrically connected with each other through mount contacts 112. The image pickup lens 102 includes an aperture stop 113 which enables adjustment of light amount entering the camera body 101.

Reference numeral 103 denotes a main mirror constituted by a half mirror. In the optical viewfinder mode, the main mirror 103 is obliquely disposed in an optical path (hereinafter, referred to as "image pickup optical path") from the image pickup lens 102, the main mirror 103 which reflects a part of a light flux from the image pickup lens 102 to introduce the reflected light flux to a viewfinder optical system.

In the optical viewfinder mode, a light flux transmitted through the main mirror 103 is reflected by a sub-mirror 104 disposed behind the main mirror 103 to be introduced to an AF sensor 105. In the live-view mode, the main mirror 103 and the sub-mirror 104 is retracted to outside of the image pickup optical path.

The AF sensor 105 is a light-receiving element disposed separately from an image pickup element described below to realize AF (autofocus) by a sensor separate type phase difference detection method. The AF sensor 105 includes a secondary image-forming lens (not shown) which divides a light flux received from the image pickup lens 102 via the sub-mirror 104 into two light fluxes (second light fluxes) to cause the two light fluxes to form two images (second two images).

The AF sensor 105 further includes a pair of line sensors (hereinafter, referred to as "line sensor pair") which photoelectrically converts the two images. Each line sensor is configured by arraying plural photoelectric conversion elements in line. The line sensor pair photoelectrically converts the two images to output two image signals corresponding to the two images.

The two image signals are sent to an image pickup controlling circuit 202 described below referring to FIG. 8. The image pickup controlling circuit 202 performs correlation calculation on the two image signals to calculate a phase difference (hereinafter, referred to as "AF sensor phase difference") which is a shift amount (including a shift direction) of the two image signals. Then, the image pickup controlling circuit 202 calculates a defocus amount (including a defocus direction) which is second focus information indicating a focus state of the image pickup lens 102.

In reality, the number of the line sensor pairs is not one. That is, plural line sensor pairs are provided corresponding to plural focus detection areas disposed in an image pickup area. The defocus amount is calculated based on the two image signals from one line sensor pair corresponding to one selected focus detection area among the plural focus detection areas. The one focus detection area is selected by the camera automatically or a photographer.

The image pickup controlling circuit 202 calculates a driving amount (including a driving direction) of a focus lens (not shown) provided in the image pickup lens 102 for obtaining an in-focus state. Moving the focus lens by the driving amount enables acquisition of the in-focus state by AF (focus control) of the sensor separate type phase difference detection method in the optical viewfinder mode.

Reference numeral 108 denotes the image pickup element constituted by a CCD sensor, a CMOS sensor or the like. Reference numeral 106 denotes a low-pass filter, and reference numeral 107 denotes a focal-plane shutter.

Reference numeral 109 denotes a focusing plate disposed in a predetermined image-forming plane of the image pickup lens 102. Reference numeral 110 denotes a penta prism for changing a viewfinder optical path. Reference numeral 114 denotes an eyepiece. The photographer can observe an object by viewing the focusing plate 109 through the eyepiece 114. The focus plate 109, the penta prism 110, and the eyepiece 104 constitute a viewfinder optical system.

Reference numeral 111 denotes an AE sensor which performs photometry by using a part of a light flux from the penta prism 110.

Reference numeral 115 denotes a release button which allows a half-pressing (first stroke) operation and a full-pressing (second stroke) operation. When the release button 115 is half-pressed, image pickup preparation processing including AE and AF is performed. When the release button 115 is fully pressed, the image pickup element 108 is exposed to perform image pickup processing for obtaining a recording image. Hereinafter, the half-pressing operation of the release button 115 is referred to as "SW1-ON", and the full-pressing operation thereof is referred to as "SW2-ON".

Reference numeral 116 denotes a live-view start/end button. Each operation of this button causes switching of the mode of the camera between the optical viewfinder mode and the live-view mode. In the live-view mode, the light flux from the image pickup lens 102 is directly introduced to the image pickup element 108. A live-view image (electronic viewfinder image) generated based on output signals from the image pickup element 108 is displayed on a display element 117 such as a liquid crystal display which is disposed on a backside of the camera body 101. Thus, an object can be observed without using the viewfinder optical system.

In the live-view mode, the light flux from the image pickup lens 102 is not introduced to the AF sensor 105. As described below, however, AF (focus control) can be performed by a phase difference detection method (hereinafter, referred to as "sensor integrated type phase difference detection method") which uses output signals from part of pixels in the image pickup element 108.

Reference numeral 118 denotes a posture sensor (motion detecting part) which detects a motion (change in posture) of the camera body 101. The posture sensor 118 is constituted by a GPS sensor, an electronic compass or a gyro sensor. Use of the posture sensor 108 enables specifying of a position or a pointing direction of the camera. Comparing an output of the posture sensor 118 at a certain time point $t_1$ with an output thereof at another time point $t_2$ enables determination of whether or not the camera body 101 has moved during the time period of t1 to t2.

Description will be made of the AF by the sensor integrated type phase difference detection method. In this embodiment, the image pickup element 108 includes image pickup pixels (image pickup pixel group) which output image pickup signals (pixel signals) used for photoelectrically converting an object image formed by the light flux from the image pickup lens 102 to generate a live-view image or a recording image. The image pickup element 108 further includes focus detection pixels (focus detection pixel group) which photoelectrically convert two images (two first images) formed by two light fluxes (first light fluxes) obtained by dividing the light flux from the image pickup lens 102 into two by a pupil dividing function described below.

Figure 2A:
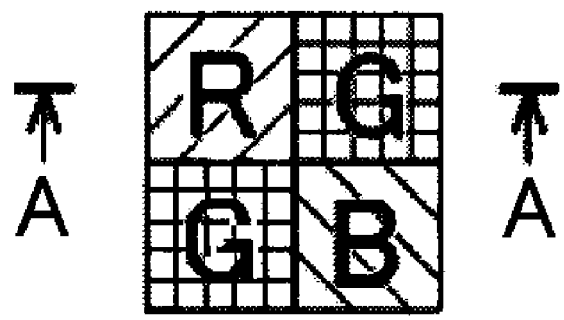
FIGS. 2A and 2B are front and sectional views showing arrangement of image pickup pixels in an image pickup element.
Figure 2B:
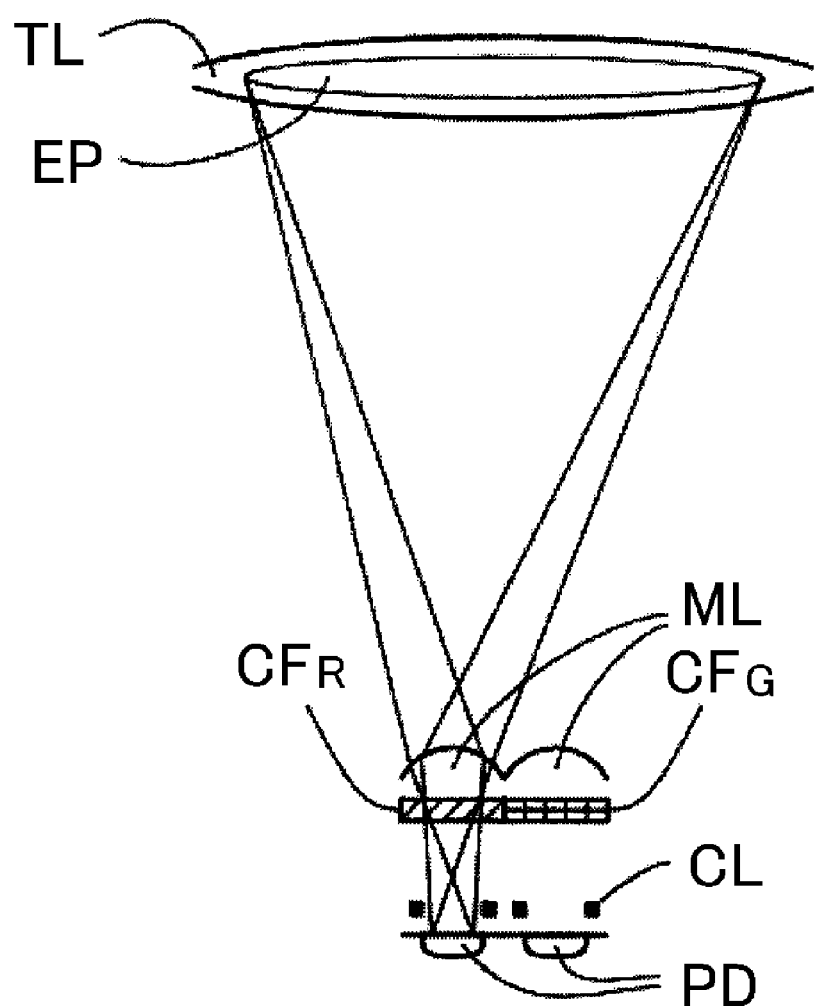

Referring to FIGS. 2A and 2B, the image pickup pixels and the focus detection pixels will be described. FIG. 2A shows image pickup pixels of 2 rows×2 columns. In this embodiment, as the image pickup element 108, a two-dimensional single plate CMOS color image sensor (CMOS sensor) in which primary color filters of red (R), green (G) and blue (B) are Bayer-arranged is used.

In the Bayer arrangement, two G-pixels of four pixels of 2 rows×2 columns are diagonally arranged, and an R-pixel and a B-pixel are arranged as two other pixels. Such pixel arrangement of 2 rows×2 columns is repeated over the entire image pickup element 108.

FIG. 2B shows a section A-A of the image pickup pixels shown in FIG. 2A. Reference character ML denotes a microlens disposed at a front face of each pixel. Reference character $CF_R$ denotes a color filter of R, and $CF_G$ a color filter of G. Reference character PD schematically denotes a photoelectric conversion portion of the CMOS sensor. Reference character CL denotes a wiring layer forming signal lines to transmit various signals in the CMOS sensor. Reference character TL schematically denotes the image pickup optical system.

The microlens ML and the photoelectric conversion portion PD of the image pickup pixel are configured to capture a light flux that has passed through the image pickup optical system TL as effectively as possible. In other words, an exit pupil EP of the image pickup optical system TL and the photoelectric conversion portion PD are placed in a conjugate relationship by the microlens ML, and an effective area of the photoelectric conversion portion PD is set large.

FIG. 2B shows an entering light flux into the R pixel. The light flux that has passed through the image pickup optical system TL similarly enters the G pixel and the B pixel. Thus, a diameter of the exit pupil EP corresponding to each image pickup pixel of R, G and B is enlarged to enable efficient capturing of a light flux from the object. This can improve an S/N ratio of the image pickup signal used for generating the live-view image or the recording image.

Figure 3A:
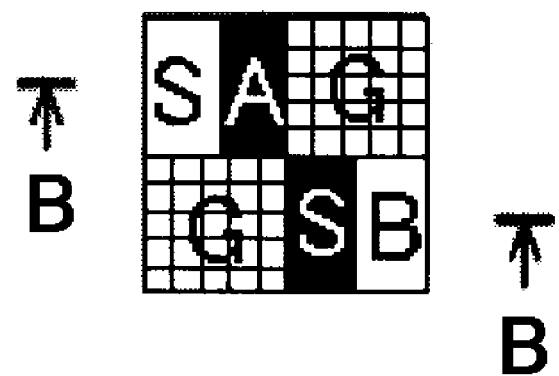
FIGS. 3A and 3B are front and sectional views showing arrangement of focus detection pixels in the image pickup element.

FIG. 3A is a plane view of pixels of 2 rows×2 columns including focus detection pixels which perform pupil division of the image pickup optical system in a horizontal direction (lateral direction). A G-pixel outputs a G-image pickup signal which forms a main component of brightness information. Humans have image recognition characteristics sensitive to the brightness information, and hence a loss of the G-pixel easily causes recognition of image quality deterioration. Conversely, the R- and B-pixels are mainly used for obtaining color information. However, humans are insensitive to the color information, and hence image quality deterioration is difficult to be recognized even when some losses occur in the pixels for obtaining the color information.

Thus, in this embodiment, among the image pickup pixels of 2 rows×2 columns shown in FIG. 2A, the G-pixels are provided as image pickup pixels, while part of the R- and B-pixels are replaced by the focus detection pixels. In FIG. 3A, the focus detection pixels are denoted by reference characters SA and SB.

Figure 3B:
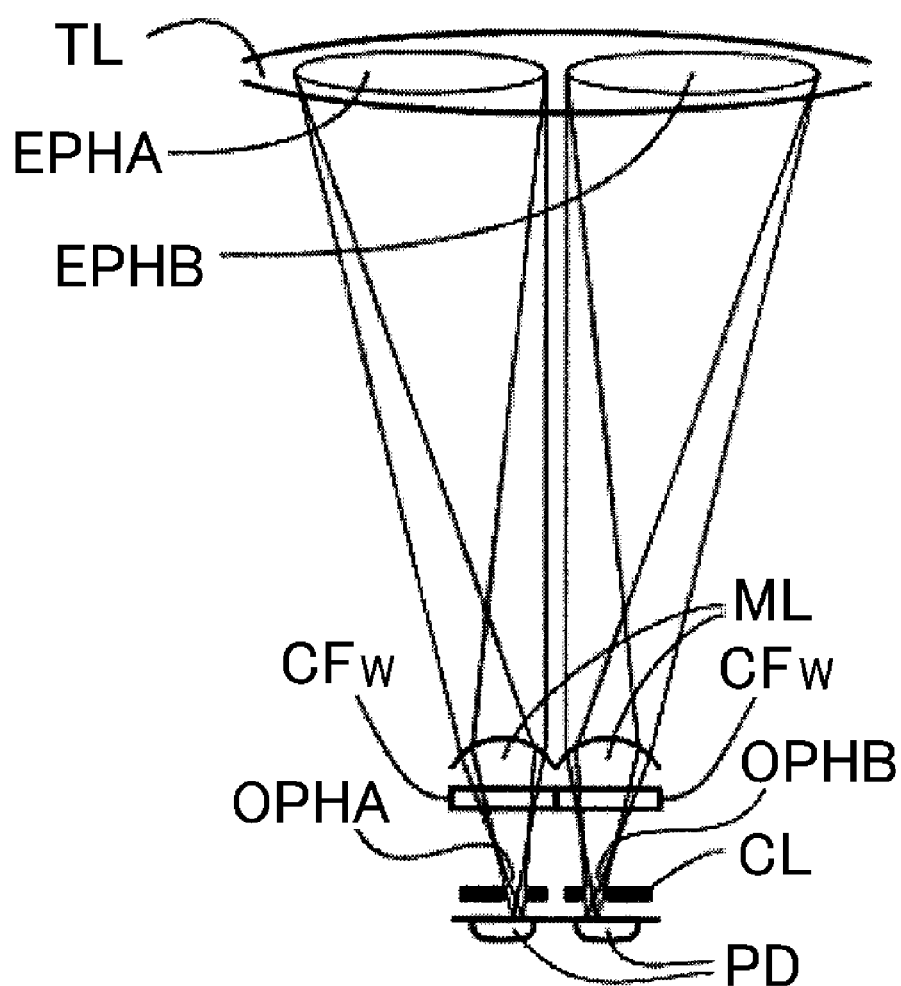

FIG. 3B shows a section B-B of the focus detection pixels shown in FIG. 3A. A microlens ML and a photoelectric conversion portion PD provided for the focus detection pixel are similar to those for the image pickup pixel shown in FIG. 2B.

In this embodiment, a pixel signal from the focus detection pixel is not used for generating the live-view image or the recording image, and hence a transparent (white) film $CF_w$ is provided in the focus detection pixel in place of the color filter. In order to provide the pupil dividing function to the focus detection pixel, apertures (hereinafter, referred to as "stop apertures") OPHA and OPHB formed in the wiring layer CL are shifted in one direction with respect to a center line of the microlens ML.

Specifically, in the focus detection pixel SA, the stop aperture OPHA is shifted to a right side to receive a light flux that has passed through a left exit pupil area EPHA of the exit pupil of the image pickup optical system TL. On the other hand, the stop aperture OPHB in the focus detection pixel SB is shifted to a left side (side opposite to the stop aperture OPHA) to receive a light flux that has passed through a right exit pupil area EPHB of the exit pupil of the image pickup optical system TL. Thus, the focus detection pixels SA and SB can receive two images (two first images) of the same object to photoelectrically convert the two images.

Plural focus detection pixels SA are regularly arranged in the horizontal direction, and one of the two images formed on the focus detection pixels SA is referred to as "A-image". Plural focus detection pixels SB are regularly arranged in the horizontal direction, and the other one of the two images formed on the focus detection pixels SB is referred to as "B-image".

The A- and B-images are photoelectrically converted by the focus detection pixels SA and SB, respectively. A phase difference (hereinafter, referred to as "focus detection pixel phase difference") which is a shift amount (including a shift direction) of image signals output from the focus detection pixels SA and SB is calculated. Then, based on the focus detection pixel phase difference, a defocus amount (including a defocus direction) which is first focus information indicating a focus state of the image pickup lens 102 can be obtained.

In a case of detecting a phase difference between the A- and B-images in a vertical direction (longitudinal direction), the stop aperture OPHA in the focus detection pixel SA and the stop aperture OPHB in the focus detection pixel SB are only required to be respectively shifted to an upper side and a lower side. In other words, the focus detection pixels SA and SB are only required to be rotated by 90° with respect to those shown in FIG. 3A.

Figure 4:
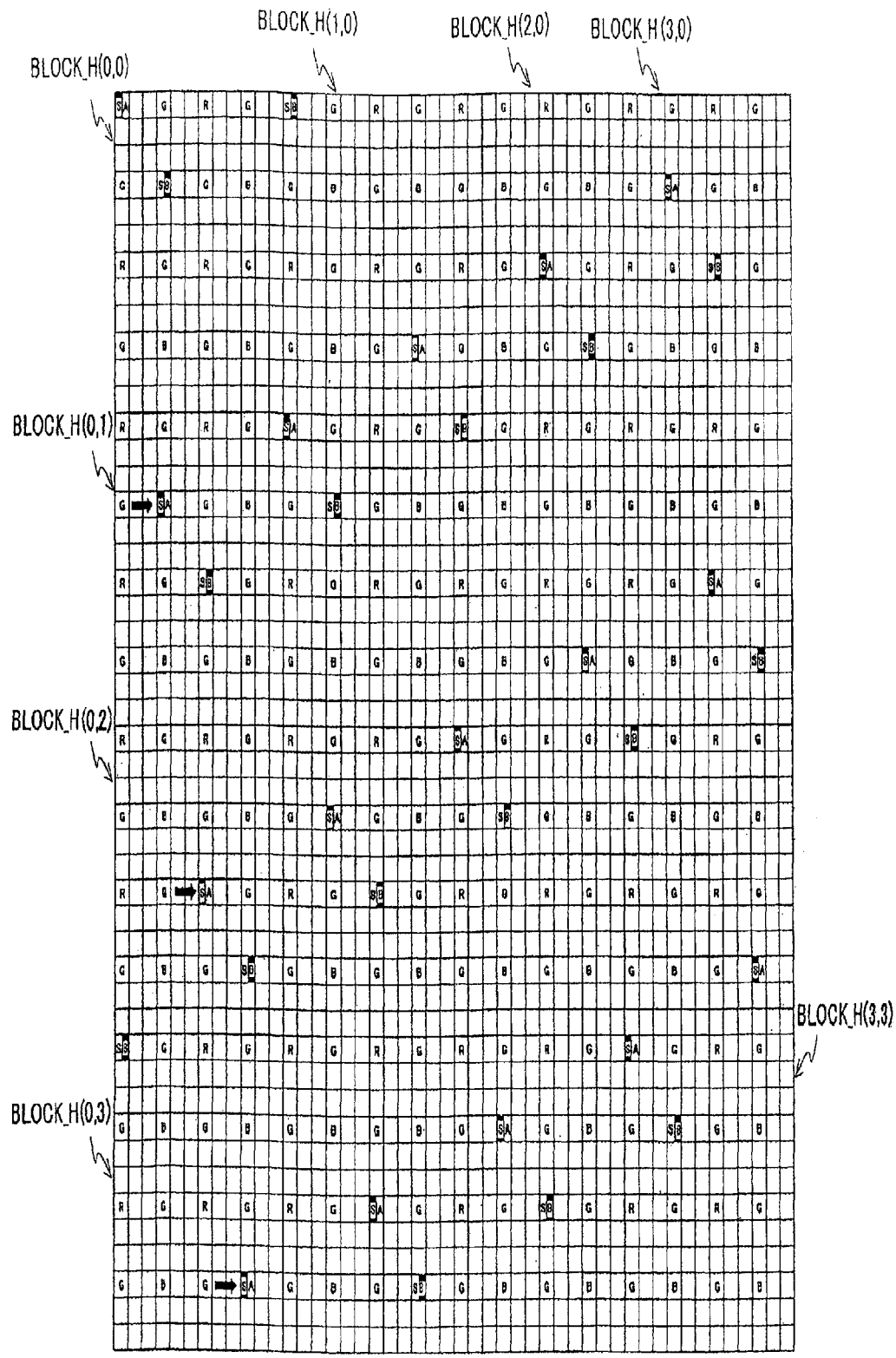
FIG. 4 is a front view showing an arrangement example of the image pickup pixels and the focus detection pixels on the image pickup element in Embodiment 1.

FIG. 4 shows an arrangement example of the image pickup pixels and the focus detection pixels in the image pickup element 108. In the camera of this embodiment, in order to increase a frame rate for displaying a moving image on the display element 117 in the live-view mode, the number of read-out pixels in each of the H (horizontal) and V (vertical) directions is reduced to ⅓ of that of the whole pixels in each direction.

In FIG. 4, image pickup pixels denoted by G, R and B are the read-out pixels from which pixel signals are read out. Pixels having no symbols written therein are non-read-out pixels from which pixel signals are not read out. However, the pixel signals of these non-read-out pixels are read out when the pixel signals of the entire pixels are read out (e.g., when the recording image is acquired).

The focus detection pixels SA and SB are arranged to be out of an arrangement cycle of the image pickup pixels such that the pixel signals of the focus detection pixels SA and SB can be read out even when the number of the read-out pixels is reduced as above. In this embodiment, in consideration that the focus detection pixels SA and SB are not used for generating an image, the focus detection pixels SA and SB are discretely arranged with spaces in the H and V directions. In order to prevent pixel losses (that is, image deterioration) in the generated image due to the focus detection pixels SA and SB from being noticeable, it is desirable that no focus detection pixel be disposed at positions of the G-pixels.

In this embodiment, a pair of the focus detection pixels SA and SA is disposed in one block including pixels of 4 rows×4 columns when the number of the read-out pixel is reduced (pixels of 12 rows×12 columns when the number of the read-out pixel is not reduced), each block being indicated by a thick black frame in FIG. 4. In FIG. 4, reference character BLOC_H (x, y) indicates a block name. 4×4 blocks constitute one pixel unit. One pixel unit corresponds to one focus detection area.

In one pixel unit, in blocks located at a same position in an x direction but at different positions in a y direction, the focus detection pixels SA and SB are respectively shifted by one pixel in the H direction when the number of the read-out pixel is reduced (by three pixels when the number of the read-out pixel is not reduced). This shifting is indicated by arrows in FIG. 4. The shifting is employed to improve sampling characteristics of the discretely arranged focus detection pixels.

In other words, since the focus detection pixels SA and SB are pixels which are pupil-divided in the x direction, an amount of the shifting is set to one pixel so as to perform dense sampling of the focus detection pixels SA and SB. For the same reason, in blocks located at a same position in the y direction but at different positions in the x direction, the focus detection pixels SA and SB are respectively shifted by one pixel in the V direction when the number of the read-out pixel is reduced (by three pixels when the number of the read-out pixel is not reduced).

Then, plural pixel units are disposed at positions corresponding to the plural focus detection areas in the entire image pickup element 108. Then, the pixel signals (i.e., two image signals) from the focus detection pixels SA and SB corresponding to the focus detection area selected as described above are read out. Although FIG. 4 shows an example where the image signals in the horizontal direction are obtained to be used for the AF, it is only necessary to employ pixel arrangement shown in FIG. 5 where the horizontal and vertical directions of FIG. 4 are inverted in a case of obtaining the image signals in the vertical direction.

Figure 5:
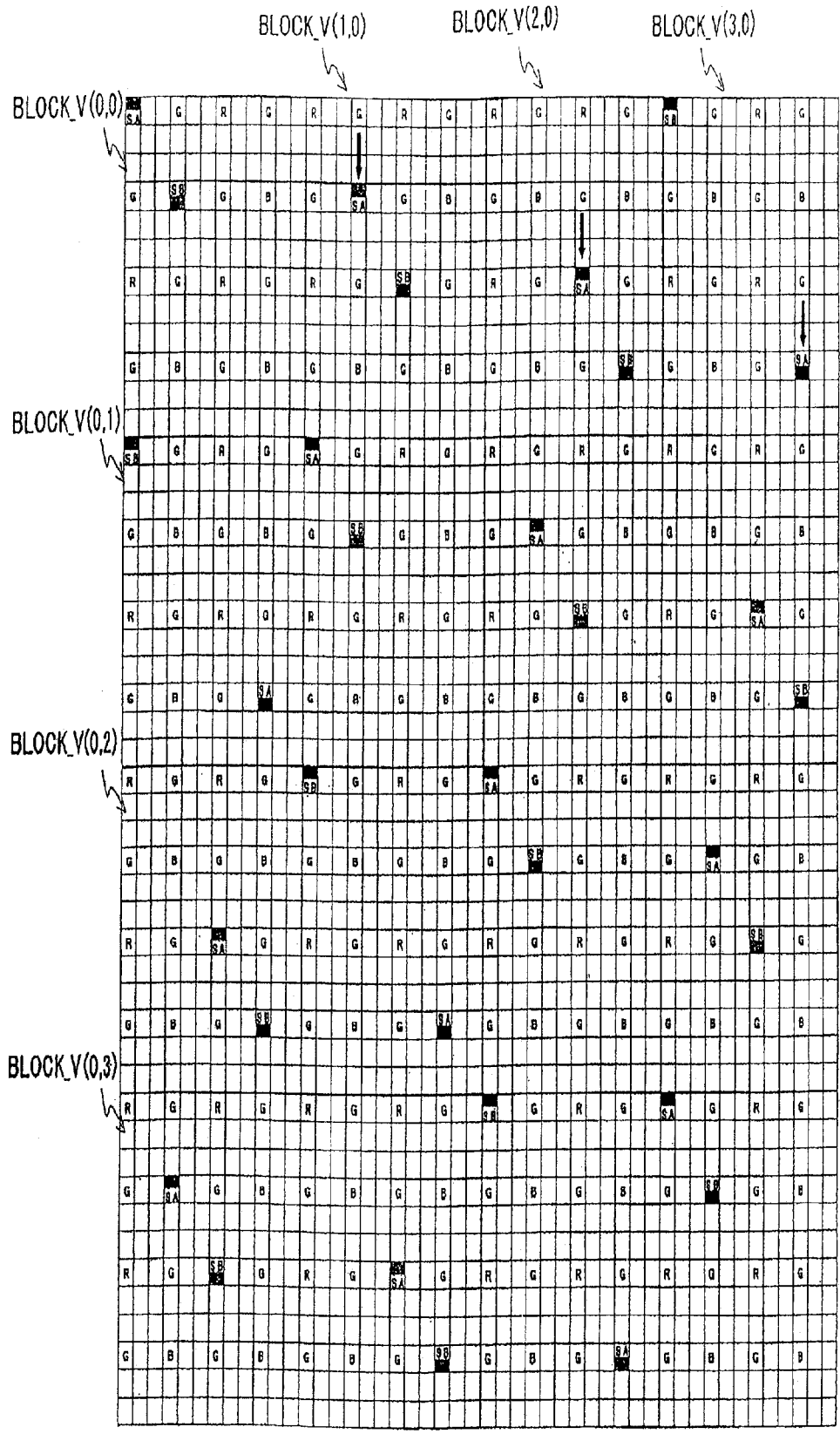
FIG. 5 is a front view showing another arrangement example of the image pickup pixels and the focus detection pixels on the image pickup element in Embodiment 1.
Figure 6:
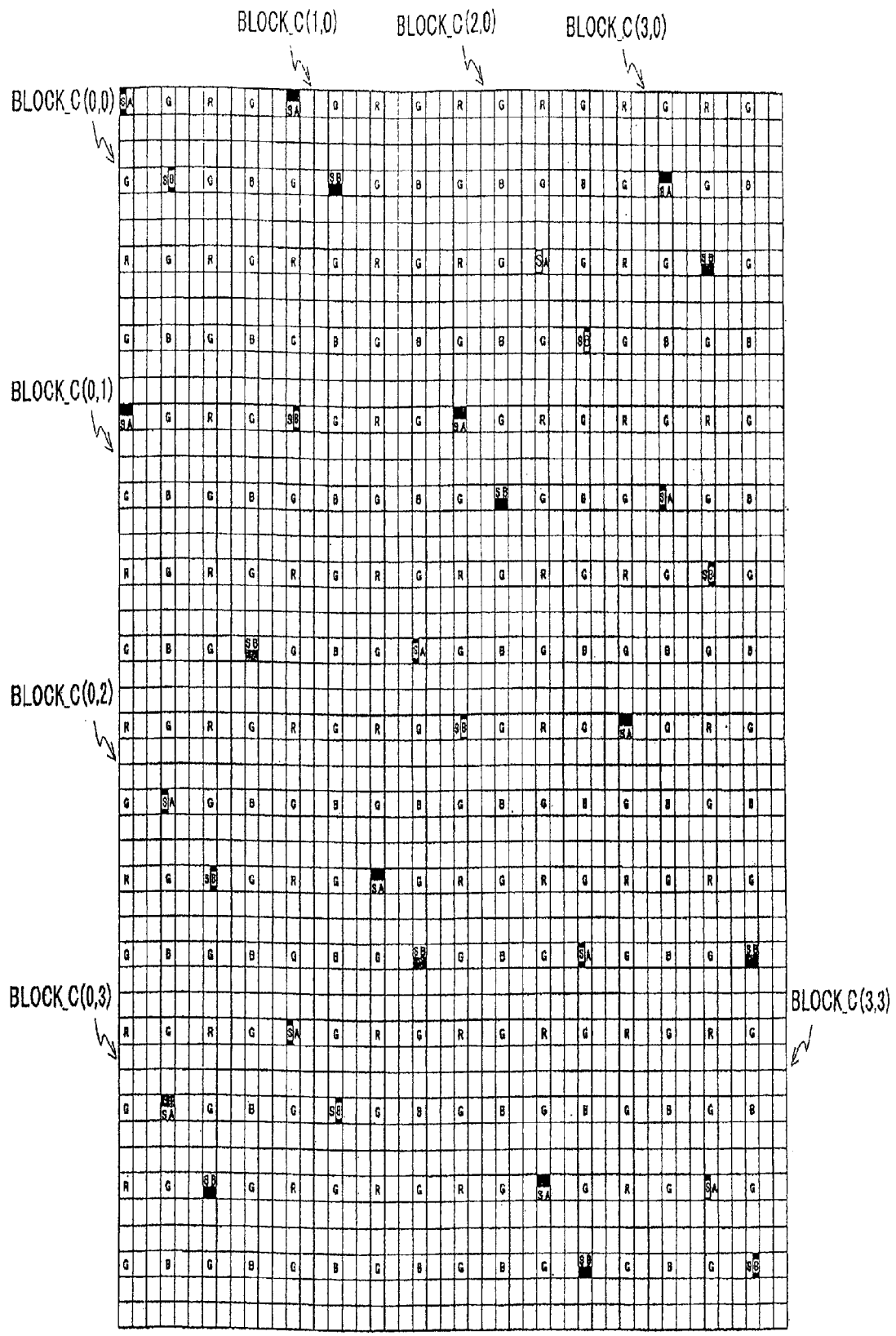
FIG. 6 is a front view showing still another arrangement of the image pickup pixels and the focus detection pixels on the image pickup element in Embodiment 1.

Further, when the arrangement of the focus detection pixels shown in FIG. 4 and that shown in FIG. 5 are combined, the focus detection pixels are arranged in a checkered manner as shown in FIG. 6, which enables acquisition of the image signals in the horizontal and vertical directions.

Figure 7:
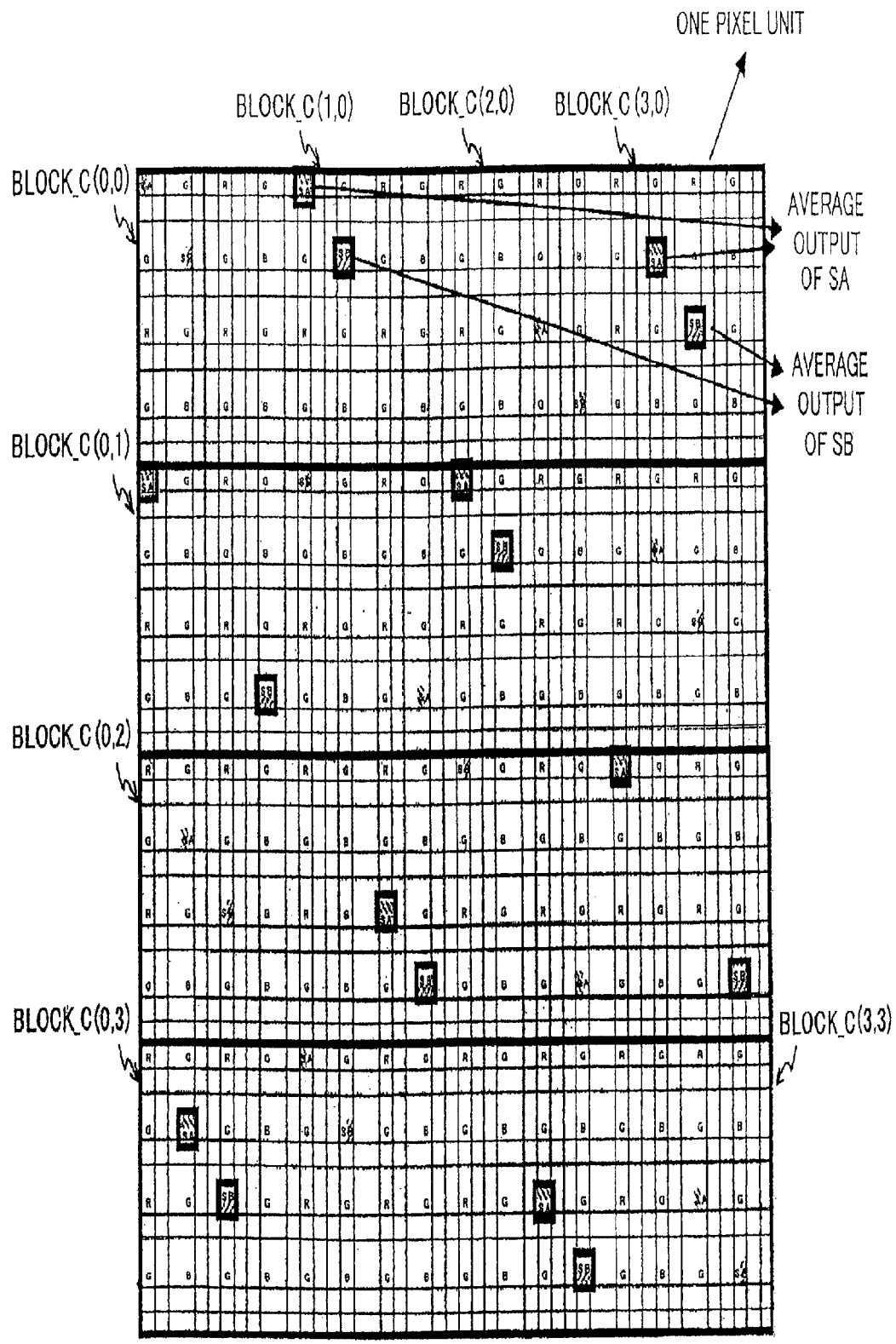
FIG. 7 is a view showing processing for averaging outputs of the focus detection pixels in the camera of Embodiment 1.

In real AF calculation, as shown in FIG. 7, plural focus detection pixels in one pixel unit is treated as one pixel, and the pixel signals from the plural focus detection pixels are added and averaged, whereby an S/N ratio of an output from one pixel can be increased. FIG. 7 shows an example where the pixel signals from two focus detection pixels SA or SB are added and averaged to obtain an average output as an output from one pixel. However, the number of the focus detection pixels whose outputs are averaged can be arbitrarily set.

The image pickup element 108 in this embodiment has the pixel arrangement shown in FIG. 6, which enables execution of the AF by the sensor integrated type phase difference method.

As described above, the camera of this embodiment can perform the AF by the sensor separate type phase difference detection method in the optical viewfinder mode and by the sensor integrated type phase difference detection method in the live-view mode.

Next, referring to FIG. 8, an electrical configuration of the camera of this embodiment will be described. In FIG. 8, the components shown in FIG. 1 are denoted by using the same reference numerals as those in FIG. 1.

Figure 8:
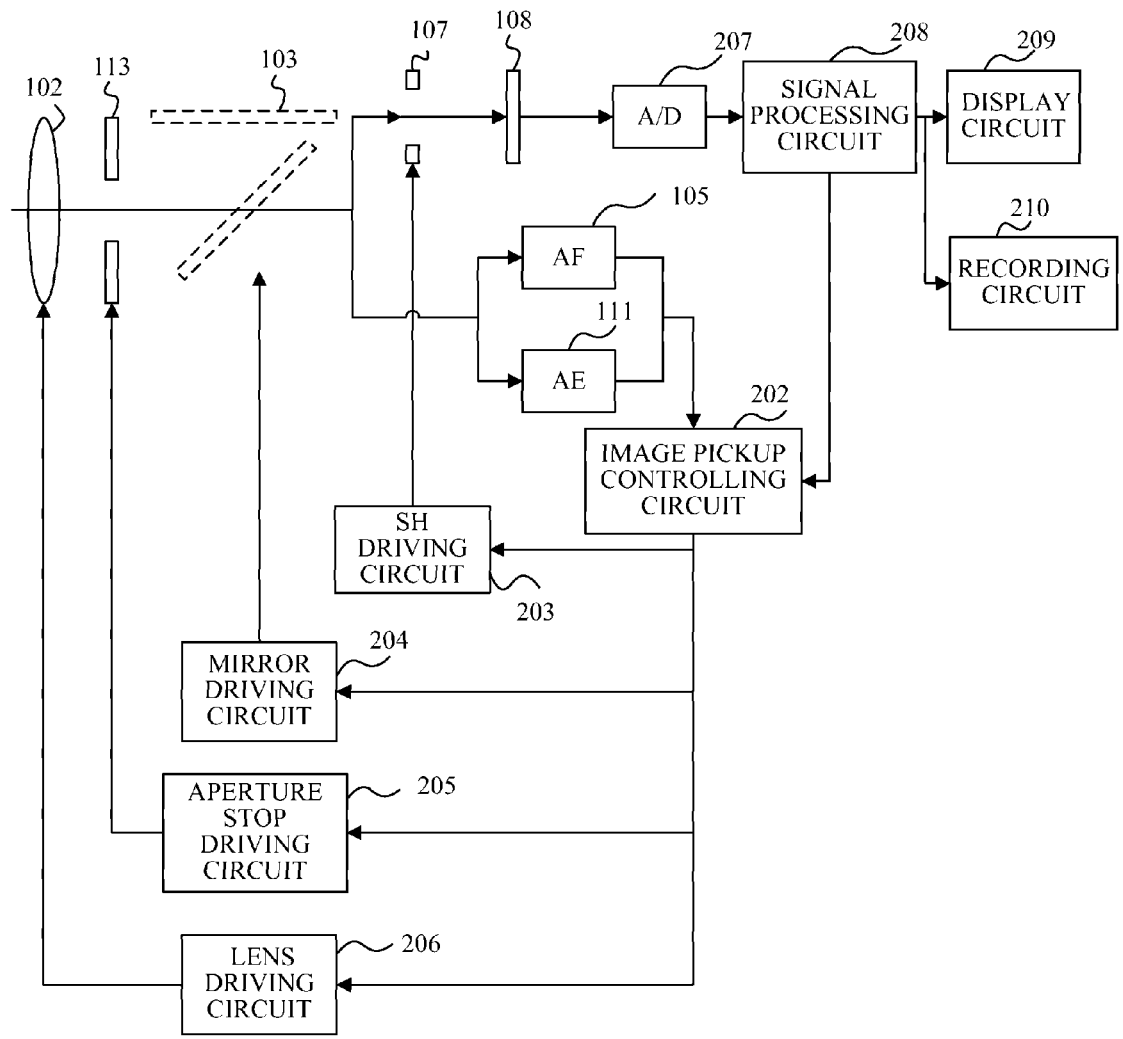
FIG. 8 is a block diagram of an electrical configuration of the camera of Embodiment 1.

In FIG. 8, a light flux entering from the image pickup lens 102 passes through the aperture stop 113 to reach the main mirror 103. In FIG. 8, the sub-mirror 104 is not shown. The main mirror 103 is switched between the optical viewfinder mode for separating the entering light flux into a reflected light flux and a transmitted light flux to introduce the light fluxes respectively to the AE sensor 111 and the AF sensor 105, and the live-view mode for retracting the main mirror 103 (and the sub-mirror 104) to outside of the image pickup optical path.

In the live-view mode, the shutter 107 is opened. Thus, the entering light directly reaches the image pickup element 108. An analog image pickup signal output from the image pickup element 108 is converted into a digital signal by an A/D converter 207 and then is input to a signal processing circuit 208 which is an image generating part. The signal processing circuit 208 generates a color image signal by performing various signal processing on the image pickup signal. The color image signal is sent to a display circuit 209 at a predetermined cycle, and thereby a live-view image (moving image) is displayed on the display element 117 shown in FIG. 1.

In image pickup, in response to the SW2-ON, a color image signal generated as a recording image (still image) as in the live-view mode (however, with a greater number of pixels than that for the live-view image) is sent to a recording circuit 210. The recording image is thus recorded in a recording medium (not shown) such as a semiconductor memory or an optical disk. The color image signal as the recording image is also displayed on the display element 117 via the display circuit 209 for a predetermined time period.

In the live-view mode, the signal processing circuit 208 sends the two image signals obtained by the focus detection pixels in the image pickup element 108 to the image pickup controlling circuit 202. The image pickup controlling circuit 202 performs the correlation calculation for the two image signals from the focus detection pixels to calculate the focus detection pixel phase difference between the two image signals. Then, the image pickup controlling circuit 202 calculates the defocus amount of the image pickup lens 102 based on the focus detection pixel phase difference, and then drives the focus lens via a lens driving circuit 206 based on the defocus amount.

In the optical viewfinder mode, the AF sensor 111 sends a photometry signal to the image pickup controlling circuit 202. The AF sensor 105 sends the two image signals obtained by the line sensor pair to the image pickup controlling circuit 202.

The image pickup controlling circuit 202 determines, based on the photometry signal obtained from the AF sensor 111, an aperture diameter (aperture value) of the aperture stop 113 and a shutter speed for an image pickup operation. In image pickup, in response to the SW2-ON, the image pickup controlling circuit 202 controls the aperture stop 113 and the shutter 107 via an aperture stop driving circuit 205 and a shutter (SH) driving circuit 203 based on the determined aperture diameter and the determined shutter speed. The aperture stop driving circuit 205 is provided in the image pickup lens 102.

In the optical viewfinder mode, in response to the SW1-ON, the image pickup controlling circuit 202 performs the correlation calculation for the two image signals from the AF sensor 105 to calculate the AF sensor phase difference between the two image signals as described above. The image pickup controlling circuit 202 calculates the defocus amount of the image pickup lens 102 based on the AF sensor phase difference, and then drives the focus lens via the lens driving circuit 206 based on the defocus amount. The lens driving circuit 206 is provided in the image pickup lens 102.

The image pickup controlling circuit 202 serves as a first focus information calculating part, a second focus information calculating part, a correction value calculating part and a controlling part.

Figure 9:
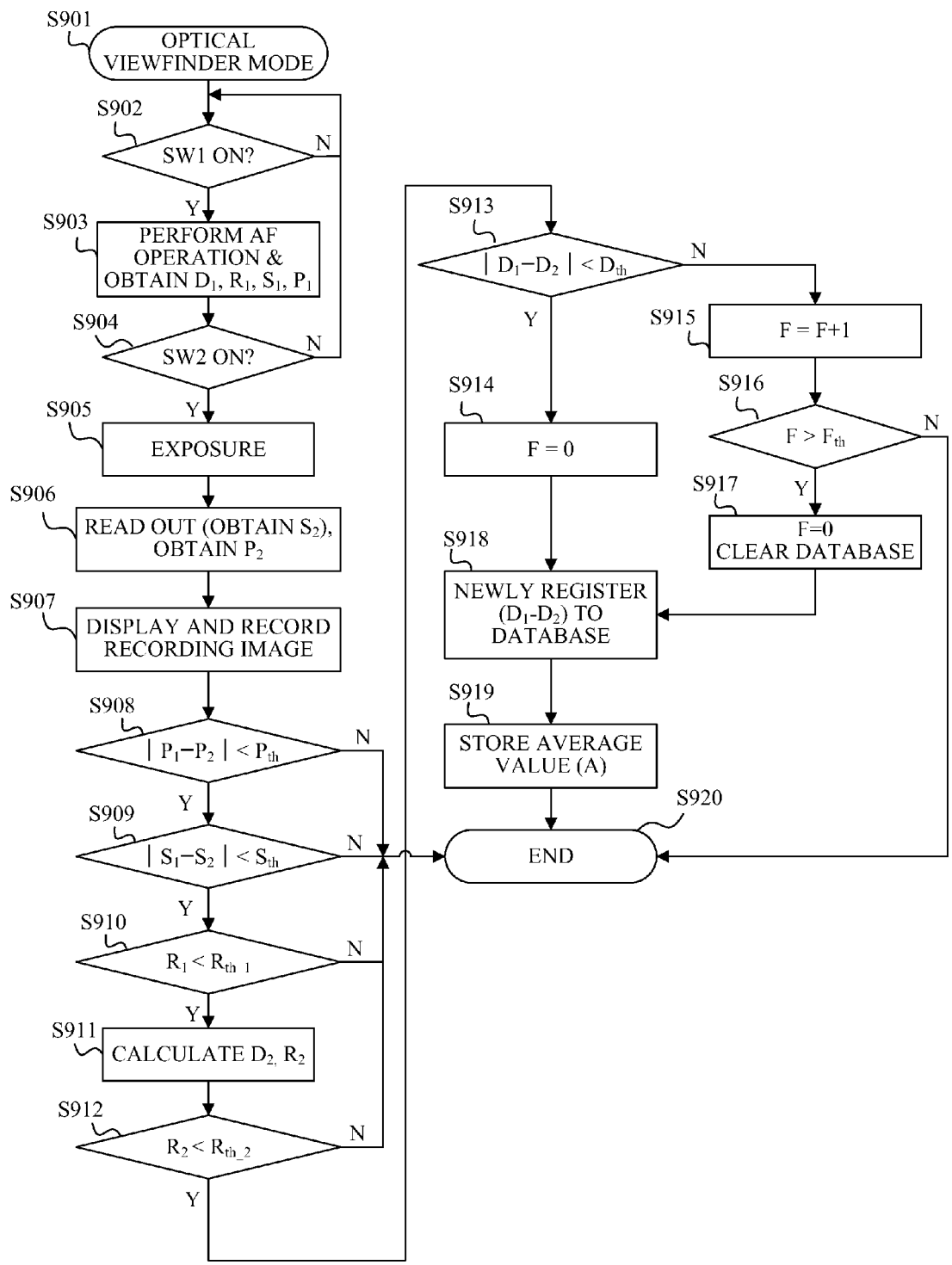
FIG. 9 is a flowchart showing an operation of the camera of Embodiment 1.

Next, referring to a flowchart shown in FIG. 9, an operation of the camera of this embodiment will be described. The operation is executed according to a computer program stored in the image pickup controlling circuit 202. The mode of the camera is set to the optical viewfinder mode (Step S901).

At Step S902, the image pickup controlling circuit 202 determines whether or not the SW1-ON has been performed. If the SW1-ON has been performed, the image pickup controlling circuit 202 proceeds to Step S903. If the SW1-ON has not been performed, the image pickup controlling circuit 202 repeats Step S902.

At Step S903, the image pickup controlling circuit 202 acquires an output $P_1$ (corresponding to an output at the time point $t_1$ described above) of the posture sensor 118 to store it in a memory (not shown). Further, the image pickup controlling circuit 202 acquires the AF sensor phase difference and then calculates the defocus amount in order to perform the AF by the sensor separate type phase difference detection method.

Then, the image pickup controlling circuit 202 acquires the driving amount of the focus lens to obtain an in-focus state based on the defocus amount, and then drives the focus lens by the driving amount via the lens driving circuit 206.

In an ideal in-focus state after the driving of the focus lens, the defocus amount obtained from the AF sensor 105 is expected to be 0. Therefore, the focus lens is driven to a target position at which the defocus amount becomes 0.

In reality, however, in order to correct an optical path difference between an AF optical system and the image pickup lens (image pickup optical system) 102 caused due to manufacturing variations or the like, the focus lens is driven so as to obtain a target defocus amount (=A) stored in the memory of the camera as a certain adjustment value (correction value).

The image pickup controlling circuit 202 stores in the memory, after completion of the driving of the focus lens (that is, after completion of the AF), a position of the line sensor pair used for the AF among the plural line sensor pairs. Further, the image pickup controlling circuit 202 obtains, after the completion of the AF, the AF sensor phase difference again to calculate the defocus amount (second focus information) $D_1$ from the AF sensor phase difference and reliability $R_1$ of the defocus amount $D_1$. Then, the image pickup controlling circuit 202 stores in the memory the defocus amount $D_1$ and the reliability $R_1$ thereof after completion of the AF. Further, after the completion of the AF, the image pickup controlling circuit 202 stores two image signals $S_1$ obtained from the line sensor pair in the memory.

The defocus amount $D_1$ is a defocus amount obtained after the completion of the AF, and hence the defocus amount $D_1$ ideally becomes a value of A which is the target defocus amount (adjustment value) described above.

In real AF, however, because of controllability of the focus lens and variations on the output of the AF sensor 105, the focus lens is not driven until an actual defocus amount becomes a value completely equal to the target defocus amount (adjustment value), but is controlled so as to be within a certain in-focus range (±P). In other words, the defocus amount $D_1$ may be within a numerical value range which satisfies the following expression, and does not necessarily need to match the target defocus amount (adjustment value) A completely.

$$(A-P) \leq D_1 \leq (A+P)$$

Regarding the reliability of the AF calculation result (the reliability $R_1$ of the defocus amount $D_1$), various methods for quantification thereof have been offered. In this embodiment, the reliability is determined to be higher as coincidence in shape of the image signals corresponding to the A- and B-images is higher.

Reliability R is calculated by the following expression where $A_i$ and $B_i$ (i=1, 2, 3, . . . , n) respectively represent the image signals corresponding to the A- and B-images obtained after the AF, each image signal being obtained by a line sensor constituted by totally n (plural) photoelectric conversion elements.

$$R = \sum_{i=1}^{n} |A_i - B_i|^2$$

The value of R becomes smaller as the coincidence in shape of the image signals corresponding to the A- and B-images becomes higher, but real reliability becomes higher as the value of R becomes smaller.

At Step S904, the image pickup controlling circuit 202 determines whether or not the SW2-ON has been performed. If the SW2-ON has been performed, the image pickup controlling circuit 202 proceeds to Step S905. If not, the image pickup controlling circuit 202 repeats Step S904.

At Step S905, the image pickup controlling circuit 202 retracts the main mirror 103 and the sub-mirror 104 to the outside of the image pickup path via the mirror driving circuit 204 to perform an exposure operation of the image pickup element 108 for obtaining a recording image, in other words, an image pickup operation. Then, the image pickup controlling circuit 202 proceeds to Step S906.

At Step S906, the image pickup controlling circuit 202 reads out the two image signals obtained from the focus detection pixels in the image pickup element 108. At this time point (corresponding to the time point $t_2$ described above), the image pickup controlling circuit 202 stores an output $P_2$ of the posture sensor 118 in the memory. Further, the image pickup controlling circuit 202 causes the signal processing circuit 208 to perform interpolation processing for generating a pixel signal at a position of each focus detection pixel by using the pixel signal of an image pickup pixel located in the vicinity of the focus detection pixel.

Figure 10:
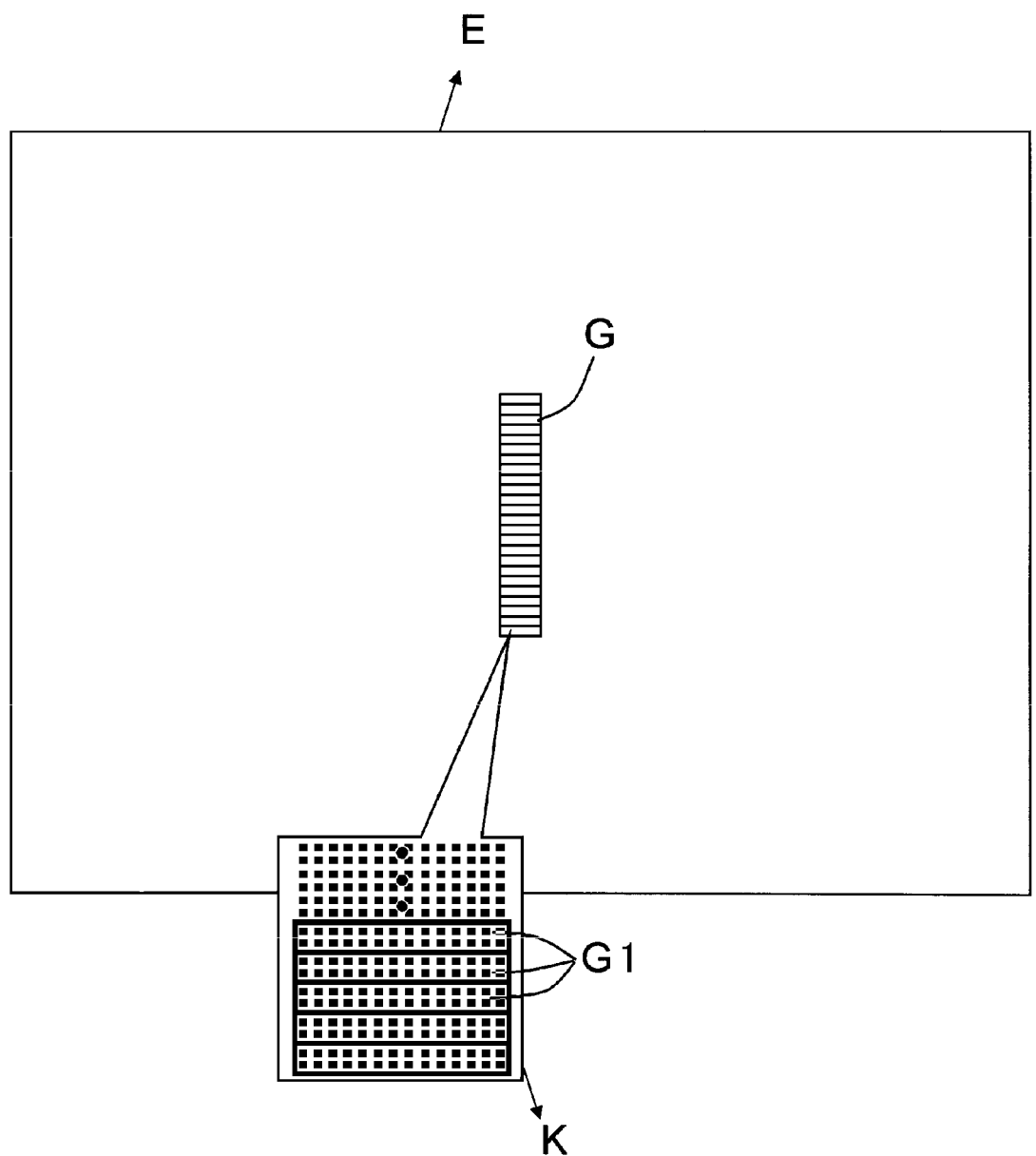
FIG. 10 shows an area corresponding to an AF sensor (line sensor) on the image pickup element.

Moreover, at this Step, the image pickup controlling circuit 202 stores in the memory the image signal obtained from the focus detection pixel corresponding to a same area in the image pickup element 108 as the focus detection area corresponding to the line sensor pair used for the AF stored in the memory at Step 903 as $S_2$. At this point, the image pickup controlling circuit 202 processes the output from the focus detection pixel according to a size of each photoelectric conversion element constituting the line sensor. Referring to FIG. 10, this processing will be described.

FIG. 10 shows a case where the AF is performed at Step S903 by using the line sensor disposed at a center of the image pickup area E and constituted by the photoelectric conversion elements arranged in the vertical direction. In the image pickup element 108, outputs from the focus detection pixels included in each area G1 corresponding to each photoelectric conversion element of the line sensor disposed at the center are averaged as shown in FIG. 7.

Thus, in signal processing, an arrangement pitch of the photoelectric conversion elements in the line sensor and that of the focus detection pixels in the image pickup element 108 can be treated as a same pitch. This makes it possible to simply compare the image signal obtained from the line sensor with the image signal obtained from the focus detection pixel. Then, the image pickup controlling circuit 202 proceeds to Step S907.

At Step S907, the image pickup controlling circuit 202 records the recording image generated by the signal processing circuit 208 in the recording medium via the recording circuit 210, and displays the recording image on the display element 117 via the display circuit 209. Then, the image pickup controlling circuit 202 proceeds to step S908.

At Step S908, the image pickup controlling circuit 202 calculates a difference between the outputs $P_1$ and $P_2$ of the posture sensor 118 obtained at the time point when the image signal has been obtained from the AF sensor 105 after the completion of the AF (Step S903) and at the time point when the image signal has been obtained from the focus detection pixels (Step S906). Then, the image pickup controlling circuit 202 determines whether or not the difference, in other words, a motion amount of the camera, is smaller than a threshold value (predetermined value) $P_{th}$.

Thus, the image pickup controlling circuit 202 can determine whether or not the camera has moved little or greatly during the time period from the time point when the image signal has been obtained from the AF sensor 105 to the time point when the image signal has been obtained from the focus detection pixels.

If the difference ($|P_1-P_2|$) between $P_1$ and $P_2$ is smaller than the threshold value $P_{th}$, the image pickup controlling circuit 202 determines that the camera has moved little, and then proceeds to Step S909. In other cases, the image pickup controlling circuit 202 determines that the camera has greatly moved and then proceeds to Step S920 to end the operation.

"The time point when the image signal is (has been) obtained from the AF sensor 105" may be a time point when the AF sensor phase difference or the defocus amount $D_1$ is (has been) calculated. In view of a program processing speed, these time points can be regarded as a same time point. "The time point when the image signal is (has been) obtained from the focus detection pixels" may be a time point when the focus detection pixel phase difference or a defocus amount $D_2$ described below is (has been) detected, and these time points can be regarded as a same time point.

When the posture sensor 118 is constituted of plural sensors such as a GPS and an electronic compass, the difference between the outputs $P_1$ and $P_2$ of each of the sensors may be compared with the threshold value $P_{th}$. It is desirable that the image pickup controlling circuit 202 proceed to Step S909 when the differences between the outputs $P_1$ and $P_2$ of all the sensors are smaller than the threshold value $P_{th}$.

At Step S909, the image pickup controlling circuit 202 compares the image signals at the time points of Steps S903 and S906 with each other to determine whether or not the camera has moved. In this case, the image pickup controlling circuit 202 itself serves as the motion detecting part.

A similarity S between the image signal $S_1$ obtained from the AF sensor at the time point of Step S903 and the image signal $S_2$ obtained from the focus detection pixels at the time point of Step S906, the image signals $S_1$ and $S_2$ having been stored in the memory, is represented by the following expression:

$$S = \sum |S_1 - S_2|^2$$

A real similarity is higher as the value of S is smaller.

If the similarity S is smaller than a threshold value (predetermined value) $S_{th}$, the image pickup controlling circuit 202 determines that the camera has moved little and then proceeds to Step S910. In other cases, the image pickup controlling circuit 202 determines that the camera has greatly moved and then proceeds to Step S920 to end the operation.

At Step S910, the image pickup controlling circuit 202 evaluates the reliability $R_1$ of the defocus amount $D_1$ obtained using the AF sensor 105. This is because an accurate in-focus state cannot be obtained even if a final adjustment value A is calculated using an AF result whose reliability is low. At this Step, if the reliability $R_1$ is smaller than a reliability threshold value (predetermined value) $R_{th\_1}$, the image-pickup controlling circuit 202 determines that the reliability is sufficiently high and then proceeds to Step S911. In other cases, the image pickup controlling circuit 202 proceeds to Step S920 to end the operation.

At Step S911, the image pickup controlling circuit 202 calculates the defocus amount (first focus information) $D_2$ by the sensor separate type phase difference detection method by using the image signals $S_2$ obtained from the focus detection pixels and stored in the memory. In this case, the image pickup controlling circuit 202 also calculates reliability $R_2$ of the defocus amount $D_2$. Then, the image pickup controlling circuit 202 stores the defocus amount $D_2$ and the reliability $R_2$ in the memory.

In the sensor separate type phase difference detection method, in order to reduce an influence of spherical aberration of the image pickup lens 102, it is necessary to correct the defocus amount according to the aperture value for image pickup. The image pickup controlling circuit 202 sets a defocus amount corrected according to the aperture value for image pickup as the defocus amount $D_2$. Then, the image pickup controlling circuit 202 proceeds to Step S912.

At Step S912, as at Step S910, the image pickup controlling circuit 202 evaluates the reliability $R_2$ of the defocus amount $D_2$. If the reliability $R_2$ is smaller than a reliability threshold value (predetermined value) $R_{th\_2}$, the image pickup controlling circuit 202 determines that the reliability is high and then proceeds to Step S913. In other cases, the image pickup controlling circuit 202 proceeds to Step S920 to end the operation.

Through the above steps, the image pickup controlling circuit 202 determines whether or not to calculate the final adjustment value A according to the reliability of the calculated defocus amount and the presence of the motion of the camera.

Thus, at Step S913, the image pickup controlling circuit 202 calculates a difference ($|D_1-D_2|$) between the defocus amount $D_1$ and the defocus amount $D_2$ respectively obtained by using the AF sensor 105 and the focus detection pixels after the completion of the AF. If the difference is larger than a threshold value (predetermined value) $D_{th}$, the image pickup controlling circuit 202 proceeds to Step S915. The difference between the defocus amount $D_1$ and the defocus amount $D_2$ is large in a case where a scene to be captured is changed due to, for example, a motion of the object between the time point when the image signal is obtained from the AF sensor 105 and the time point when the image signal is obtained from the focus detection pixels.

In this case, it is impossible to calculate the adjustment value A accurately, and hence the adjustment value A is not calculated. If the difference between the defocus amount $D_1$ and the defocus amount $D_2$ is smaller than the threshold value $D_{th}$, in order to calculate the final adjustment value A, the image pickup controlling circuit 202 sets F=0 at Step S914 to proceed to Step S918.

In manufacturing of the camera, since AF adjustment is performed at a manufacturing plant, a default adjustment value A is set within a certain adjustment accuracy range, and a value of $|(D_1-A)-D_2|$ becomes a value close to 0. However, if maladjustment makes the default adjustment value A extremely different from its original value, error processing is always performed at Step S913 to end the AF operation.

Therefore, when initial maladjustment occurs, special processing is performed at Steps S914 to S917. The special processing uses the fact that the initial maladjustment always causes the processing to proceed to Step S915 from Step S913.

At Step S915, the image pickup controlling circuit 202 increments a counter F by 1. Then, when the counter F continuously counts up to a predetermined value $F_{th}$, the image pickup controlling circuit 202 forcibly calculates the adjustment value A even if a condition of $|D_1-D_2|<D_{th}$ is not satisfied.

In order to select only the case where the process continuously proceeds from Step S913 to Step S915, the image pickup controlling circuit 202 clears the counter F (F=0) at Step S914 and then proceeds to Step 918. When the counter F counts up to the predetermined value $F_{th}$, the image pickup controlling circuit 202 clears the counter F (F=0) at Step S917 and also clears a database of the adjustment value A. Then, the image pickup controlling circuit 202 proceeds to Step S918.

The adjustment value A and the database thereof will be described. The adjustment value A corresponds to the difference ($D_1-D_2$) between the defocus amounts $D_1$ and $D_2$. However, since there are variations on the outputs of the AF sensor 105 and the focus detection pixels, there also are certain range variations on the defocus amounts $D_1$ and $D_2$ calculated based on the outputs of the AF sensor 105 and the focus detection pixels. Therefore, storing results of calculation of the difference ($D_1-D_2$) performed several times in the memory to use an average value of the stored differences as the final adjustment value A enables acquisition of a highly accurate adjustment value A which absorbs the variations on the defocus amounts $D_1$ and $D_2$. The database is formed in a database memory (not shown) provided in the camera body 101.

For example, in a case of storing the results of the calculation of the difference ($D_1-D_2$) performed 100 times in the database memory provided in the camera body 101, the adjustment value A which is an average value of the differences ai (i=1 to 100) is represented by the following expression:

$$A = \frac{\sum_{i=1}^{100} a_i}{100}$$

When the counter F continuously increases to exceed the predetermined value $F_{th}$ at Step S916, a possibility is high that the defocus amounts $D_1$ and $D_2$ have not been normally calculated and the values of all ai in the database are not appropriate values. Thus, at Step S917, the image pickup controlling circuit 202 clears the database at Step 917.

At Step S918, the image pickup controlling circuit 202 calculates the difference ($D_1-D_2$) between the defocus amounts $D_1$ and $D_2$. Then, the image pickup controlling circuit 202 newly registers (stores) the difference ($D_1-D_2$) as $a_i$ in the database. When the number of ai registered in the database exceeds a predetermined value (e.g., 100), the oldest ai is deleted from the database. Then, the image pickup controlling circuit 202 proceeds to Step S919.

At Step S919, the image pickup controlling circuit 202 calculates an average value of all ai in the database to store a result of the calculation as the adjustment value A in the memory. Thus, in this embodiment, the adjustment value A is calculated after each time the focus control (AF) and the image pickup operation for capturing the recording image are performed by the sensor separate type phase difference detection method. Then, at Step S920, the operation is ended.

As described above, this embodiment calculates the adjustment value (correction value) A based on the defocus amount $D_2$ which is the first focus information and the defocus amount $D_1$ which is the second focus information. In other words, this embodiment calculates, without using a contrast detection method, the adjustment value A based on the defocus amount $D_2$ obtained by using the focus detection pixels in the image pickup element 108 and the defocus amount $D_1$ obtained by using the AF sensor 105. Thus, this embodiment can easily obtain the adjustment value A within a short time period and increase accuracy of the AF performed by using the sensor separate type phase difference detection method.

This embodiment has been described the case where the adjustment value A is obtained for one line sensor pair used for the AF of the sensor separate type phase difference detection method. However, in a case where plural line sensor pairs are provided, adjustment values A may be obtained all together for all the line sensor pairs.

In this case, defocus amounts $D_1$ obtained by line sensor pairs not used for the AF are also stored in the memory. Then, a defocus amount $D_2$ may be obtained by the sensor integrated type phase difference method in each area in the image pickup element corresponding to each line sensor pair, and the adjustment value A may be obtained for each line sensor pair based on a difference between the defocus amounts $D_1$ and $D_2$.

Embodiment 2

As shown in FIG. 1B, the camera is in the same state (mode) in the live-view mode and during the image pickup operation. Thus, not only during the image pickup operation but also in the live-view mode, the outputs can be read out from the focus detection pixels in the image pickup element 108 and the defocus amount $D_2$ can be also calculated.

In a second embodiment (Embodiment 2) of the present invention, therefore, after each switching from the optical viewfinder mode to the live-view mode or from the live-view mode to the optical viewfinder mode, defocus amounts $D_1$ and $D_2$ are calculated as defocus amounts before and after the switching. Then, a difference ($D_1$–$D_2$) therebetween is registered in a database to calculate an adjustment value (correction value) A.

Figure 11:
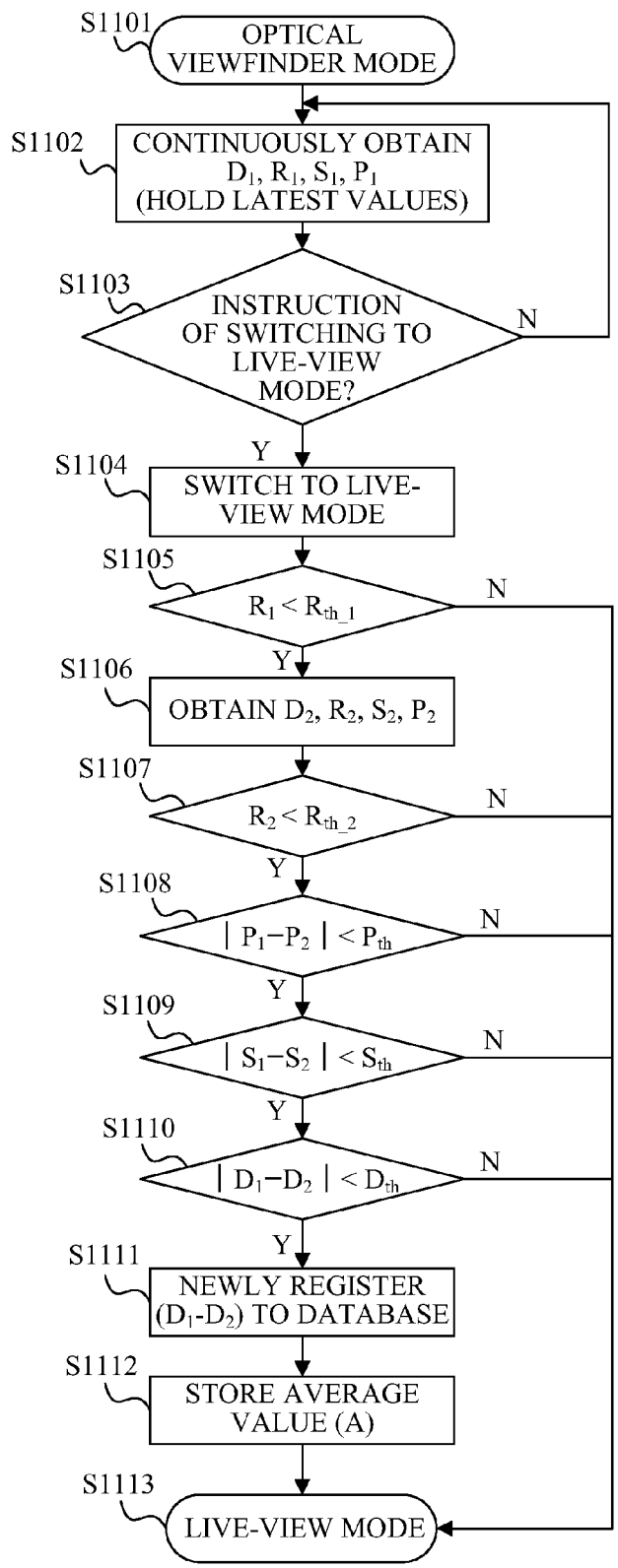
FIGS. 11 and 12 are flowcharts showing operations of a camera which is Embodiment 2 of the present invention.

A flowchart of FIG. 11 shows an operation of the camera performed when the adjustment value A is calculated in response to the switching from the optical viewfinder mode to the live-view mode. In Embodiment 2, components identical to those in Embodiment 1 are denoted by the same reference numerals as those in Embodiment 1.

After setting of the optical viewfinder mode (Step S1101), at step S1102, an image pickup controlling circuit 202 continuously obtains the defocus amount $D_1$ by the sensor separate type phase difference detection method, reliability $R_1$ thereof, image signals $S_1$ and an output $P_1$ of a posture sensor 118. Then, the image pickup controlling circuit 202 holds latest values of $D_1$, $R_1$, $S_1$ and $P_1$ until a user inputs an instruction of switching to the live-view mode at Step S1103 described below.

At Step S1103, the image pickup controlling circuit 202 determines whether or not the user has input the instruction of switching to the live-view mode. If the switching instruction has been input, at Step S1104, the image pickup controlling circuit 202 switches its mode to the live-view mode.

At Step S1105, the image pickup controlling circuit 202 compares the reliability $R_1$ lastly obtained in the optical viewfinder mode with a threshold value $R_{th\_1}$. If the reliability $R_1$ is lower than the threshold value $R_{th\_1}$, the image pickup controlling circuit 202 cancels calculation of the adjustment value A to proceed to Step S1113. On the other hand, if the reliability $R_1$ is higher than the threshold value $R_{th\_1}$, the image pickup controlling circuit 202 proceeds to Step S1106.

At Step S1106, the image pickup controlling circuit 202 obtains the defocus amount $D_2$ by the sensor integrated type phase difference detection method, reliability $R_2$ thereof, image signals $S_2$, and an output $P_2$ of the posture sensor 118.

Then, at Step S1107, the image pickup controlling circuit 202 compares the reliability $R_2$ with a threshold value $R_{th\_2}$. If the reliability $R_2$ is lower than the threshold value $R_{th\_2}$, the image pickup controlling circuit 202 cancels the calculation of the adjustment value A to proceed to Step S1113. On the other hand, if the reliability $R_2$ is higher than the threshold value $R_{th\_2}$, the image pickup controlling circuit 202 proceeds to Step S1108.

At Steps S1108 to S1110, the image pickup controlling circuit 202 compares the outputs $P_1$ and $P_2$ of the posture sensor 118, the image signals $S_1$ and $S_2$, and the defocus amounts $D_1$ and $D_2$ with each other. If each difference therebetween is larger than a threshold value, the image pickup controlling circuit 202 cancels the calculation of the adjustment value A to proceed to Step S1113. On the other hand, if the each difference is smaller than the threshold value, the image pickup controlling circuit 202 proceeds to Step S1111.

At Step S1111, the image pickup controlling circuit 202 newly registers the difference ($D_1$–$D_2$) between the defocus amounts $D_1$ and $D_2$ as ai in the database. Then, at Step S1112, the image pickup controlling circuit 202 stores an average value of all ai in the database as the adjustment value A in a memory.

At Step S1113, the image pickup controlling circuit 202 ends the operation of the switching to the live-view mode.

Figure 12:
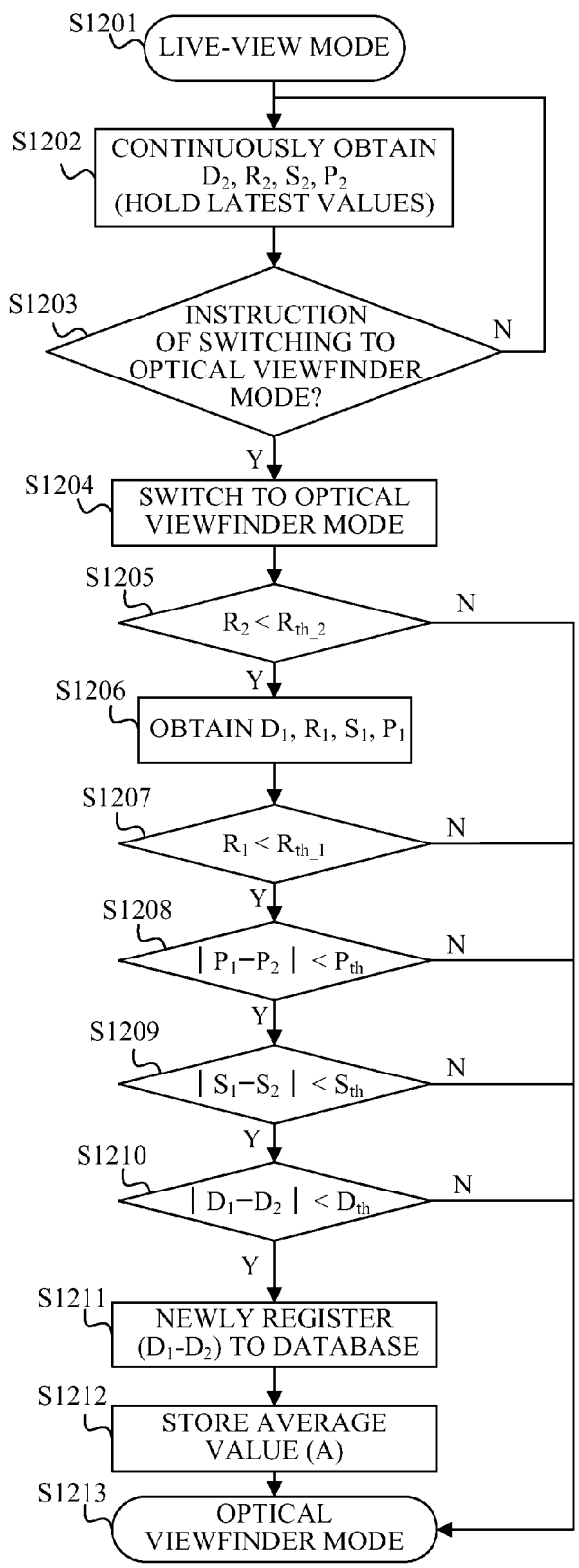

A flowchart of FIG. 12 shows an operation of the camera performed when the adjustment value A is calculated in response to the switching from the live-view mode to the optical viewfinder mode.

After setting of the live-view mode (Step S1201), at step S1202, the image pickup controlling circuit 202 continuously obtains a defocus amount $D_2$ by the sensor integrated type phase difference detection method, reliability $R_2$ thereof, image signals $S_2$, and an output $P_2$ of the posture sensor 118. Then, the image-pickup controlling circuit 202 holds latest values of $D_2$, $R_2$, $S_2$, and $P_2$ until the user inputs an instruction of switching to the optical viewfinder mode at Step S1203 described below.

At Step S1203, the image pickup controlling circuit 202 determines whether or not the user has input the instruction of switching to the optical viewfinder mode. If the switching instruction has been input, at Step S1204, the image pickup controlling circuit 202 switches its mode to the optical viewfinder mode.

At Step S1205, the image pickup controlling circuit 202 compares the reliability $R_2$ lastly obtained in the live-view mode with a threshold value $R_{th\_2}$. If the reliability $R_2$ is lower than the threshold value $R_{th\_2}$, the image pickup controlling circuit 202 cancels calculation of the adjustment value A to proceed to Step S1213. On the other hand, if the reliability $R_2$ is higher than the threshold value $R_{th\_2}$, the image pickup controlling circuit 202 proceeds to Step S1206.

At Step S1206, the image pickup controlling circuit 202 obtains a defocus amount $D_1$ by the sensor separate type phase difference detection method, reliability $R_1$ thereof, image signals $S_1$, and an output $P_1$ of the posture sensor 118.

Then, at Step S1207, the image pickup controlling circuit 202 compares the reliability $R_1$ with a threshold value $R_{th\_1}$. If the reliability $R_1$ is lower than the threshold value $R_{th\_1}$, the image pickup controlling circuit 202 cancels the calculation of the adjustment value A to proceed to Step S1213. On the other hand, if the reliability $R_1$ is higher than the threshold value $R_{th\_1}$, the image pickup controlling circuit 202 proceeds to Step S1208.

At Steps S1208 to S1210, the image pickup controlling circuit 202 compares the outputs $P_1$ and $P_2$ of the posture sensor 118, the image signals $S_1$ and $S_2$, and the defocus amounts $D_1$ and $D_2$ with each other. If each difference therebetween is larger than a threshold value, the image pickup controlling circuit 202 cancels the calculation of the adjustment value A to proceed to Step S1213. On the other hand, if the each difference is smaller than the threshold value, the image pickup controlling circuit 202 proceeds to Step S1211.

At Step S1211, the image pickup controlling circuit 202 newly registers the difference $(D_1-D_2)$ between the defocus amounts $D_1$ and $D_2$ as ai in the database. Then, at Step S1212, the image pickup controlling circuit 202 stores an average value of all ai in the database as the adjustment value A in the memory.

At Step S1213, the image pickup controlling circuit 202 ends the operation of the switching to the optical viewfinder mode.

Furthermore, the present invention is not limited to these embodiments and various variations and modifications may be made without departing from the scope of the present invention.

For example, each of the above embodiments has been described the case where the defocus amounts are calculated as the first focus information and the second focus information. However, the first focus information and the second focus information may be phase differences between two images or driving amounts of the focus lens.

Further, each of the above embodiments has been described a lens interchangeable type single lens reflex digital camera. However, the present invention can be applied to a digital camera or a video camera of a lens integrated type.

This application claims the benefit of Japanese Patent Application No. 2008-284331, filed on Nov. 5, 2008, which is hereby incorporated by reference herein in its entirety.

What is claimed is:

1. An image-pickup apparatus comprising:
   an image pickup element configured to include image pickup pixels for photoelectrically converting an object image formed by a light flux from an image pickup optical system and focus detection pixels for photoelectrically converting two images formed by first light fluxes which are two divided light fluxes from the image pickup optical system;
   a first focus information calculating part configured to calculate first focus information indicating a focus state of the image pickup optical system based on outputs from the focus detection pixels;
   a light-receiving element provided separately from the image pickup element and configured to photoelectrically convert two images formed by second light fluxes which are two divided light fluxes from the image pickup optical system;
   a second focus information calculating part configured to calculate second focus information indicating a focus state of the image pickup optical system based on an output from the light-receiving element;
   a correction value calculating part configured to calculate a correction value based on the first focus information and the second focus information;
   a controlling part configured to perform focus control of the image pickup optical system based on the second focus information corrected using the correction value;
   a display element; and
   an optical viewfinder,
   wherein the apparatus is switchable between a first mode for introducing the light flux from the image pickup optical system to the image pickup element and displaying on the display element a viewfinder image generated using outputs from the image pickup element and a second mode for guiding the light flux from the image pickup optical system to the optical viewfinder, and
   wherein the correction value calculating part calculates the correction value after each switching between the first mode and the second mode.

2. An image-pickup apparatus according to claim 1, wherein the correction value calculating part calculates the correction value after each time the focus control and an image pickup operation for capturing a recording image are performed.

3. An image-pickup apparatus according to claim 1, comprising:
   an image pickup element configured to include image pickup pixels for photoelectrically converting an object image formed by a light flux from an image pickup optical system and focus detection pixels for photoelectrically converting two images formed by first light fluxes which are two divided light fluxes from the image pickup optical system;
   a first focus information calculating part configured to calculate first focus information indicating a focus state of the image pickup optical system based on outputs from the focus detection pixels;
   a light-receiving element provided separately from the image pickup element and configured to photoelectrically convert two images formed by second light fluxes which are two divided light fluxes from the image pickup optical system;
   a second focus information calculating part configured to calculate second focus information indicating a focus state of the image pickup optical system based on an output from the light-receiving element;
   a correction value calculating part configured to calculate a correction value based on the first focus information and the second focus information; and
   a controlling part configured to perform focus control of the image pickup optical system based on the second focus information corrected using the correction value,
   wherein the correction value calculating part calculates the correction value when a difference between the first focus information and the second focus information is smaller than a predetermined value.

4. An image-pickup apparatus according to claim 3, wherein the correction value calculating part calculates the correction value after each time the focus control and an image pickup operation for capturing a recording image are performed.

5. An image-pickup apparatus comprising:
   an image pickup element configured to include image pickup pixels for photoelectrically converting an object image formed by a light flux from an image pickup optical system and focus detection pixels for photoelectrically converting two images formed by first light fluxes which are two divided light fluxes from the image pickup optical system;
   a first focus information calculating part configured to calculate first focus information indicating a focus state of the image pickup optical system based on outputs from the focus detection pixels;
   a light-receiving element provided separately from the image pickup element and configured to photoelectrically convert two images formed by second light fluxes which are two divided light fluxes from the image pickup optical system;

a second focus information calculating part configured to calculate second focus information indicating a focus state of the image pickup optical system based on an output from the light-receiving element;

a correction value calculating part configured to calculate a correction value based on the first focus information and the second focus information;

a controlling part configured to perform focus control of the image pickup optical system based on the second focus information corrected using the correction value; and a motion detecting part configured to detect a motion of the image pickup apparatus, wherein the correction value calculating part calculates the correction value when an amount of the motion detected by the motion detecting part between a time point when the first focus information calculating part obtains the outputs from the focus detection pixels and a time point when the second focus information calculating part obtains the output from the light-receiving element is smaller than a predetermined value.

6. An image-pickup apparatus according to claim 5, wherein the correction value calculating part calculates the correction value after each time the focus control and an image pickup operation for capturing a recording image are performed.

7. A focus control method for an image pickup apparatus which includes: an image pickup element configured to include image pickup pixels for photoelectrically converting an object image formed by a light flux from an image pickup optical system and focus detection pixels for photoelectrically converting two images formed by first light fluxes which are two divided light fluxes from the image pickup optical system; a light-receiving element provided separately from the image pickup element and configured to photoelectrically convert two images formed by second light fluxes which are two divided light fluxes from the image pickup optical system; a display element; and an optical viewfinder, the method comprising the steps of:

calculating first focus information indicating a focus state of the image pickup optical system based on outputs from the focus detection pixels;

calculating second focus information indicating a focus state of the image pickup optical system based on an output from the light-receiving element;

calculating a correction value based on the first focus information and the second focus information; and performing focus control of the image pickup optical system based on the second focus information corrected by the correction value, wherein the apparatus is switchable between a first mode for introducing the light flux from the image pickup optical system to the image pickup element and displaying on the display element a viewfinder image generated using outputs from the image pickup element and a second mode for guiding the light flux from the image pickup optical system to the optical viewfinder, and wherein the correction value is calculated after each switching between the first mode and the second mode in the step of calculating the correction value.

8. A focus control method for an image pickup apparatus which includes: an image pickup element configured to include image pickup pixels for photoelectrically converting an object image formed by a light flux from an image pickup optical system and focus detection pixels for photoelectrically converting two images formed by first light fluxes which are two divided light fluxes from the image pickup optical system; and a light-receiving element provided separately from the image pickup element and configured to photoelectrically convert two images formed by second light fluxes which are two divided light fluxes from the image pickup optical system, the method comprising the steps of:

calculating first focus information indicating a focus state of the image pickup optical system based on outputs from the focus detection pixels;

calculating second focus information indicating a focus state of the image pickup optical system based on an output from the light-receiving element;

calculating a correction value based on the first focus information and the second focus information; and performing focus control of the image pickup optical system based on the second focus information corrected by the correction value, wherein the correction value is calculated when a difference between the first focus information and the second focus information is smaller than a predetermined value in the step of calculating the correction value.

9. A focus control method for an image pickup apparatus which includes: an image pickup element configured to include image pickup pixels for photoelectrically converting an object image formed by a light flux from an image pickup optical system and focus detection pixels for photoelectrically converting two images formed by first light fluxes which are two divided light fluxes from the image pickup optical system; and a light-receiving element provided separately from the image pickup element and configured to photoelectrically convert two images formed by second light fluxes which are two divided light fluxes from the image pickup optical system, the method comprising the steps of:

calculating first focus information indicating a focus state of the image pickup optical system based on outputs from the focus detection pixels;

calculating second focus information indicating a focus state of the image pickup optical system based on an output from the light-receiving element;

calculating a correction value based on the first focus information and the second focus information;

performing focus control of the image pickup optical system based on the second focus information corrected by the correction value; and detecting a motion of the image pickup apparatus, wherein the correction value is calculated when an amount of the motion detected by the motion detecting part between a time point when the first focus information calculating part obtains the outputs from the focus detection pixels and a time point when the second focus information calculating part obtains the output from the light-receiving element is smaller than a predetermined value in the step of calculating the correction value.

* * * * *